United States Patent
Wang et al.

(10) Patent No.: US 9,590,828 B2
(45) Date of Patent: Mar. 7, 2017

(54) BLIND SPECTRUM SENSING METHOD AND DEVICE BASED ON FAST FOURIER TRANSFORM

(71) Applicant: Southeast University, Nanjing (CN)

(72) Inventors: Dongming Wang, Nanjing (CN); Yufei Wu, Nanjing (CN); Ruixun Liu, Nanjing (CN); Xiangyang Wang, Nanjing (CN); Wenrui Tang, Nanjing (CN); Yuqi Huang, Nanjing (CN)

(73) Assignee: Southeast University, Nanjing (CN)

( * ) Notice: Subject to any disclaimer, the term of this patent is extended or adjusted under 35 U.S.C. 154(b) by 0 days.

(21) Appl. No.: 14/892,523

(22) PCT Filed: Jun. 20, 2013

(86) PCT No.: PCT/CN2013/077578
§ 371 (c)(1),
(2) Date: Nov. 19, 2015

(87) PCT Pub. No.: WO2014/190572
PCT Pub. Date: Dec. 4, 2014

(65) Prior Publication Data
US 2016/0197748 A1  Jul. 7, 2016

(51) Int. Cl.
*H04B 7/00* (2006.01)
*H04B 15/00* (2006.01)
(Continued)

(52) U.S. Cl.
CPC ........ *H04L 27/0006* (2013.01); *H04L 27/265* (2013.01); *H04L 27/2666* (2013.01); *H04L 27/2676* (2013.01); *H04W 16/14* (2013.01)

(58) Field of Classification Search
CPC .................................................. H04L 27/0006
(Continued)

(56) References Cited

U.S. PATENT DOCUMENTS

2004/0228270 A1 * 11/2004 Chen ................... H04L 27/2657
370/210
2009/0197550 A1    8/2009 Huttunen et al.
(Continued)

FOREIGN PATENT DOCUMENTS

CN    101588191 A    11/2009
CN    102882820 A    1/2013

OTHER PUBLICATIONS

Chuanhai Jiao et al., Cooperative Blind Sensing Base on Autocorrelation Matrix in Cognitive Radios, Journal of Circuits and Systems, Feb. 2011, vol. 16, No. 1, pp. 12-19, ISSN: 1007-0249 (see p. No. 19 for English abstract).
(Continued)

*Primary Examiner* — Tilahun B Gesesse
(74) *Attorney, Agent, or Firm* — Greenberg Traurig, LLP

(57) ABSTRACT

A blind spectrum sensing method and device based on fast Fourier transform. The method comprises: the spectrum sensing device receives a signal on an authorized spectrum band, calculates an autocorrelation coefficient of the received signal after sampling and filtering same, then performs a fast Fourier transform of the autocorrelation coefficient, acquires the modulus of the transform result, constructs determination variables on the basis of the modulus, and determine whether or not a signal of an authorized user is present. The method and device have the advantages of low calculation complexity, obviated need for authorization information characteristic, and insensitivity towards noise uncertainty, and are of great performance.

9 Claims, 3 Drawing Sheets

(51) Int. Cl.
*H04L 27/00* (2006.01)
*H04W 16/14* (2009.01)
*H04L 27/26* (2006.01)

(58) Field of Classification Search
USPC ........................................ 455/509, 507, 501
See application file for complete search history.

(56) References Cited

U.S. PATENT DOCUMENTS

2010/0118849 A1* 5/2010 Kimura ............... H04L 27/2691
370/338
2011/0263208 A1 10/2011 Barnawi

OTHER PUBLICATIONS

ISA/CN, International Search Report issued on PCT application No. CN2013/077578, dated Jan. 16, 2014, 4 pages.

* cited by examiner

BLIND SPECTRUM SENSING METHOD AND DEVICE BASED ON FAST FOURIER TRANSFORM

CROSS REFERENCE TO RELATED APPLICATION

The present application is a 371 U.S. National Stage of International Application No. PCT/CN2013/077578, filed Jun. 20, 2013, which claims the benefit of the earlier filing date of Chinese Patent Application No. 201310205619.1 filed on May 27, 2013, which are each incorporated herein by reference in their entirety.

TECHNICAL FIELD

The invention relates to the spectrum sensing technology in cognitive radio system, and particularly to a blind spectrum sensing method and device without sending any characteristic information of signal.

BACKGROUND

With the rapid development of wireless data service, people have increasing demands for spectrum resources and the spectrum resources are gradually decreased. On the other hand, some frequency bands utilization is very low. This leads to low efficiency of the traditional pre-assigned static spectrum management mode which is authorized to use for a long time. Therefore, how to flexibly and efficiently use the spectrum resources becomes a hotspot issue. J. Mitola first proposed the cognitive radio based spectrum-sharing concept, and such technology enables flexible utilization of the spectrum resources at any time and any place. The emergence of the cognitive radio technology greatly improves the spectrum utilization ratio, and alleviates the contradiction between the increasing demands for wireless service and the gradually decreasing spectrum resources, and the technology is commonly considered as the optimal solution for solving the existing problem of low utilization ratio of the radio spectrum.

In the cognitive radio system, the first problem to be solved is how to judge whether a signal of an authorized user exists on the spectrum. This problem is known as spectrum detecting or spectrum sensing. A common spectrum detecting method includes: energy detection, matching filter detection and cyclostationary detection. The energy detection has low complexity, but it is affected by uncertainty of the noise and its performance deteriorates severely. The matching filter has superior performance, but it needs to know the characteristic of signal being sent. Cyclostationary detection also has superior performance, but it has high complexity, and has certain limitation on practical application.

According to the covariance matrix of a receipt signal, it can judge whether a signal or noise exists on the frequency band, and the theoretical foundation of work is as follows. Generally, it is known that when a signal exists, the covariance matrix of the signal is not a diagonal matrix, and when only noise exists, the covariance matrix of the receipt signal is a matrix with equal diagonal elements. Based on the theoretical foundation, the traditional technical solution provides a method for spectrum sensing by using characteristic values of the covariance matrix of the receipt signal, a judgment variable may consist of the characteristic values of the covariance matrix, and provides a method for constructing the judgment variable, i.e., ratio of maximum characteristic values to minimum characteristic values. It can be seen that, ideally, when only the noise exists, the ratio of the maximum characteristic values to minimum characteristic values is 1, and when the signal exists, the ratio is greater than 1. The method is advantaged in no need of sending any prior information of signal and no need of any statistical property of the noise. However, calculating the maximum and minimum characteristic values needs complex characteristic value decomposition, and the computation complexity is $O(L^3)$, wherein L is the dimension of the covariance matrix. Therefore, the method has extremely high complexity, and especially when L is large, it is difficult to implement.

SUMMARY OF THE INVENTION

Technical problem: in order to overcome the effect of uncertainty of the noise on the existing energy detection, the invention provides a blind spectrum detecting method and device based on fast Fourier transform.

Technical solution: the blind spectrum sensing method based on fast Fourier transform includes the following steps:
(1) receiving a wireless signal on a frequency band to be sensed;
(2) after sampling and filtering the receipt signal, calculating the autocorrelation coefficient of the signal;
(3) performing fast Fourier transform of the autocorrelation coefficient on M point, and performing spectrum sensing according to the result of fast Fourier transform;
(4) performing modular operation on the result of fast Fourier transform, recording the module values as $f_1$, $f_2$, ..., $f_M$, and constructing numerical values $T_1$ and $T_2$ according to the module values, wherein $T_1$ and $T_2$ both are multivariate functions of $f_1, f_2, \ldots, f_M$, which at least includes one of the $f_1, f_2, \ldots, f_M$, respectively;
(5) calculating the judgment variable $T=T_1/T_2$, when T is greater than the preset judgment threshold, judging that an authorized signal exists on the spectrum, and when T is less than the preset judgment threshold, judging that no authorized signal exists, i.e., the spectrum is spare.

Preferably, the method for constructing T includes $T_1=\max(f_1, f_2, \ldots, f_M)$ and $T_2=\min(f_1, f_2, \ldots, f_M)$, wherein max( ) and min( ) represent maximizing and minimizing operations, respectively.

Preferably, the method for constructing T is $T_1=\max(f_1, f_2, \ldots, f_M)$, and $T_2$ is linear superposition of $f_1, f_2, \ldots, f_M$.

The point number M of fast Fourier transform is $2\lceil \log_2 L \rceil$, wherein $\lceil \ \rceil$ represents rounding up to an integer.

The judgment threshold is calculated by theory or simulation according to the desired false alarm probability or detection probability.

After sampling filter, N sample signals are expressed as $x(0), x(1), \ldots, x(N-1)$, and the correlation coefficient is obtained by the following method: selecting the length of the calculation window as L, and calculating the correlation coefficient of the sample signal from $l=0, \ldots, L-1$:

$$\lambda_l = \frac{1}{N}\sum_{n=0}^{N-1} x(n)x^*(n-l)$$

wherein when $n-l<0$, $x(0)=0$, the operation symbol * represents conjugate calculation, the sample number N is a positive integer greater than 1, and the window length L is a positive integer greater than or equal to 1.

The sample number N is determined according to the spectrum sensing period and the spectrum sensing precision.

The window length L is determined according to the computational capability and the spectrum sensing precision of the sensing device and complexity of fast Fourier transform.

A blind spectrum sensing device based on fast Fourier transform includes a wireless signal sampling and filtering module, a correlation coefficient calculation module, a fast Fourier transform module, a module value calculation module, a judgment variable calculation module, and a judgment module. The correlation coefficient calculation module is used for calculating the autocorrelation coefficient of the signal to be sensed.

The fast Fourier transform module is used for performing fast Fourier transform of the autocorrelation coefficient on M point and performing spectrum sensing according to the result of fast Fourier transform.

The module value calculation module is used for performing modular operation on the result of fast Fourier transform.

The judgment variable calculation module is used for constructing the judgment variable according to the module values.

The judgment module includes a comparator used for comparing the judgment variable and the judgment threshold.

With the above-mentioned technical solution, the invention has the following beneficial effects: in the judgment variable calculation phase, the method only needs fast Fourier transform operation with low complexity; as compared with the spectrum sensing based on the characteristic value in the background technology, the invention has extremely low complexity and is not sensitive to uncertainty of noise. Moreover, the invention is further suitable for the spectrum sensing and cooperative spectrum sensing of a multi-antenna system.

DETAILED DESCRIPTION

The invention is further set forth below in conjunction with specific embodiments. It is understood that these embodiments are only used for illustrating the invention without limiting the scope thereof. Upon reading the invention, various equivalent modifications, made by person skilled in the art, fall within the scope defined by the appended claims of the present application.

Figure 1:
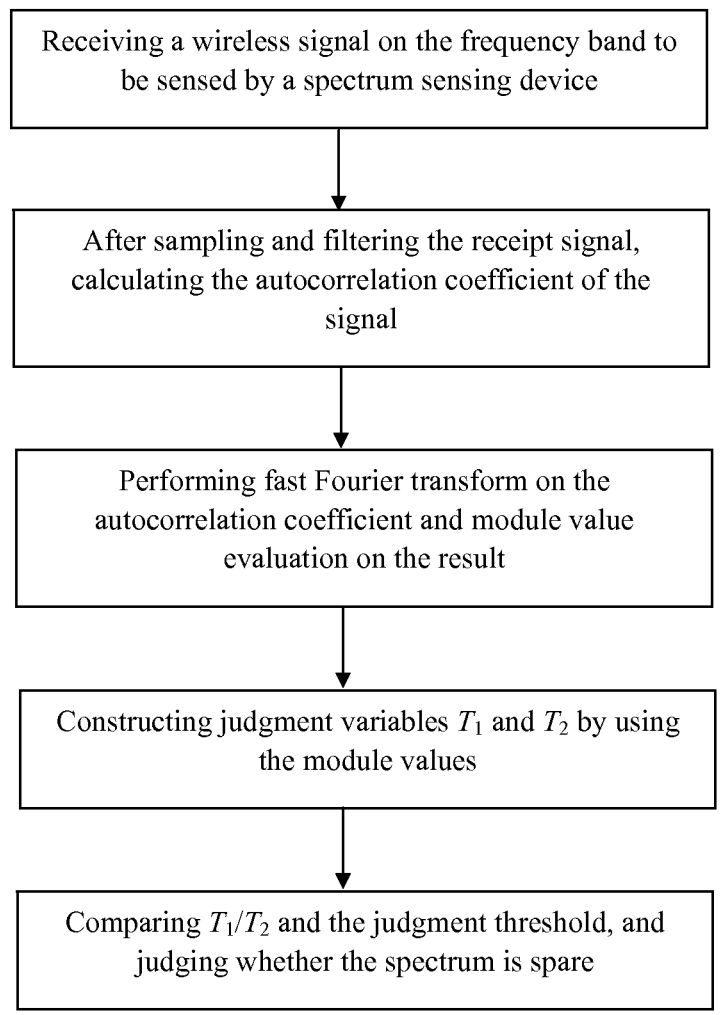
FIG. 1 is a flow diagram of a spectrum sensing method of an embodiment of the invention.

As shown in FIG. 1, a spectrum sensing method based on fast Fourier transform includes the following steps:

1) a spectrum sensing device for receiving a wireless signal on the frequency band to be sensed;
2) after the spectrum sensing device sampling and filtering the receipt signal, the autocorrelation coefficient of the signal is calculated;

After sampling filter, N sample signals are expressed as $x(0), x(1), \ldots, x(N-1)$. While being actually implemented, the covariance matrix is generally obtained smoothly by the following method. The length of the calculation window is selected as L, and the autocorrelation coefficient of the signal can be expressed as:

$$\lambda_l = \frac{1}{N}\sum_{n=0}^{N-1} x(n)x^*(n-l) \qquad \text{[Formula 1]}$$

wherein, $l=1, 2, \ldots, L$. The corresponding covariance matrix R can be expressed as:

$$R = \begin{bmatrix} \lambda_0 & \lambda_1 & \ldots & \lambda_{L-1} \\ \lambda_1^* & \lambda_0 & \ldots & \lambda_{L-2} \\ \vdots & \vdots & \ldots & \vdots \\ \lambda_{L-1}^* & \lambda_{L-2}^* & \ldots & \lambda_0 \end{bmatrix}$$

The background technology includes: performing characteristic value decomposition on R to obtain the characteristic value and detecting with the characteristic value. In order to avoid the characteristic value decomposition, through direct use of the autocorrelation coefficient of the receipt signal, a detection method using fast Fourier transform of the autocorrelation coefficient is provided. The basic principle thereof is that the signaling generally has a certain correlation, such as a TV signal, and a wireless microphone signal, while the noise is generally white noise. Therefore, the Fourier transform is calculated according to the correlation coefficient of the receipt signal. If only the noise exists, the results of Fourier transform shall have substantially equivalent amplitude, while if the signal exists, there is large difference between the amplitudes.

According to the above idea, the judgment variable can be obtained by the following steps 3)-5).

3) The spectrum sensing device performs fast Fourier transform of the autocorrelation coefficient on M point, and performs spectrum sensing according to the result of fast Fourier transform.

Specifically, fast Fourier transform of M point is performed on $\lambda_0, \lambda_1, \ldots, \lambda_L$.

4) The spectrum sensing device performs modular operation on the result of fast Fourier transform, records the module values as $f_1, f_2, \ldots, f_M$, and constructs the numerical values $T_1$ and $T_2$ according to the module values, in which $T_1$ and $T_2$ both are multivariate function of $f_1, f_2, \ldots, f_M$, which at least include one of $f_1, f_2, \ldots, f_M$, respectively.

Embodiment 1: $T_1 = \max(f_1, f_2, \ldots, f_M)$, and $T_2 = \min(f_1, f_2, \ldots, f_M)$, wherein max( ) and min( ) represent maximizing and minimizing operations, respectively.

Embodiment 2: $T_1 = \max(f_1, f_2, \ldots, f_M)$, $T_2$ is linear superposition of $f_1, f_2, \ldots, f_M$, i.e. $T_2 = f_1 + f_2 + \ldots + f_M$.

5) The spectrum sensing device calculates the judgment threshold $T = T_1/T_2$. When T is greater than the preset threshold, the spectrum sensing device judges that an authorized signal exists on the spectrum, and when T is less than the preset threshold, the spectrum sensing device judges that no authorized signal exists, i.e., the spectrum is spare.

From the above, the judgment variable can be calculated, and further the result of spectrum sensing is obtained by comparing the judgment variable and the threshold value.

The method provided in this invention has calculation complexity of O(L log(L)), and mainly focuses on calculating the correlation coefficient. As compared with the method of decomposing the characteristic value (with complexity of $O(L^3)$), the method of this invention has extremely low complexity.

The above-mentioned method may combine a multi-antenna system. It only needs to expand the calculation of the correlation coefficient to the multi-antenna system. The system has K antennas for receiving. Suppose the sample signals of the kth antenna at the nth moment are expressed as $y_k(n)$, the sample signals can be arranged to form the following signal vector, $y_1(0), y_2(0), \ldots, y_k(0), y_1(1), y_2(1), \ldots, y_k(1), \ldots, y_1(N-1), y_2(N-1), \ldots, y_k(N-1)$, and the vector length is N×K. The vector formed by the above-mentioned $y_k(n)$ is expressed as the vector $x(0), x(1), \ldots, x(NK-1)$ with a length of N×K. The correlation coefficient also can be calculated according to the above vector, thereby obtaining the corresponding judgment variable.

The work steps of the spectrum sensing method of the invention are further illustrated below in detail in conjunction with the block diagram.

As shown in FIG. 1, firstly, the spectrum sensing device receives a wireless signal on the frequency band to be sensed, and after sampling and filtering the receipt signal, the autocorrelation coefficient of the signal is calculated according to [Formula 1]. Then, fast Fourier transform is performed on the correlation coefficient and module value calculation is performed on the result. Then, the spectrum sensing device calculates the judgment variable $T_1$ and $T_2$, and calculates their ratio T, when T is greater than the preset judgment threshold, it judges that an authorized signal exists on the spectrum, and when T is less than the preset judgment threshold, it judges that no authorized signal exists, i.e., the spectrum is spare.

Figure 2:
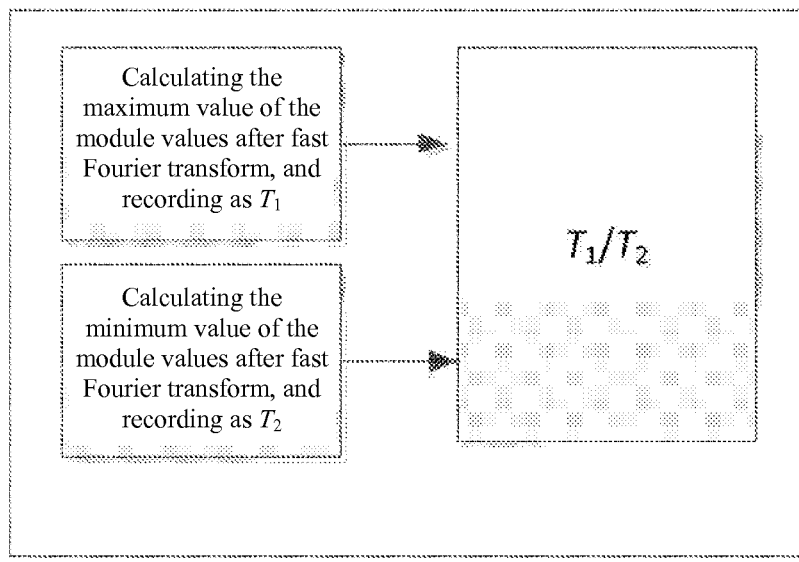
FIG. 2 is a schematic diagram of judgment variable construction of a specific embodiment 1 of the invention.
Figure 3:
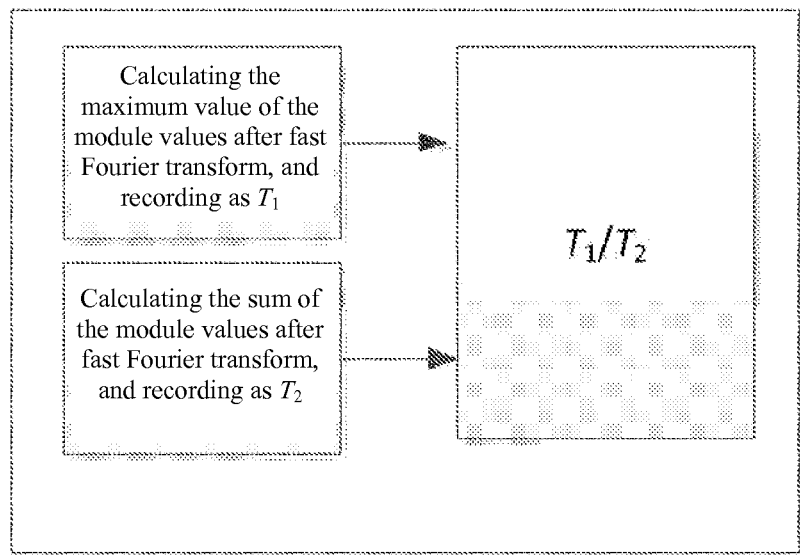
FIG. 3 is a schematic diagram of judgment variable construction of a specific embodiment 2 of the invention.

FIGS. 2 and 3 provide construction of the judgment variables of embodiments 1 and 2 in the spectrum sensing algorithm of the invention.

Figure 4:
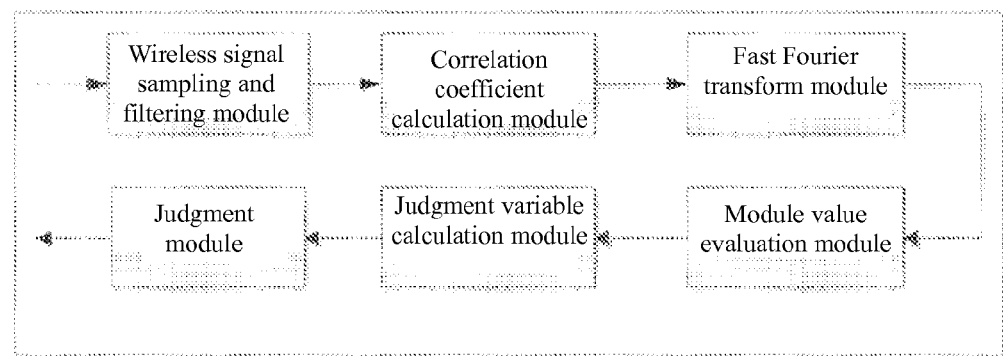
FIG. 4 is a structural schematic diagram of a spectrum sensing device of an embodiment of the invention.

In conjunction of the block diagram 4, the spectrum sensing device of the invention is further illustrated below in detail. As shown in FIG. 4, the spectrum sensing device of this embodiment includes: a wireless signal sampling and filtering module, a correlation coefficient calculation module, a fast Fourier transform module, a module value calculation module, a judgment variable calculation module and a judgment module. Among the above, the correlation coefficient calculation module is used for calculating the autocorrelation coefficient of the signal to be sensed. The fast Fourier transform module is used for performing fast Fourier transform of on the autocorrelation coefficient on M point and performing spectrum sensing according to the result of fast Fourier transform. The module value calculation module is used for performing modular operation on the result of the fast Fourier transform. The judgment variable module is used for constructing the judgment variable according to the module values. The judgment module includes a comparator used for comparing the judgment variable and the judgment threshold to judge if a signal exists.

Figure 5:
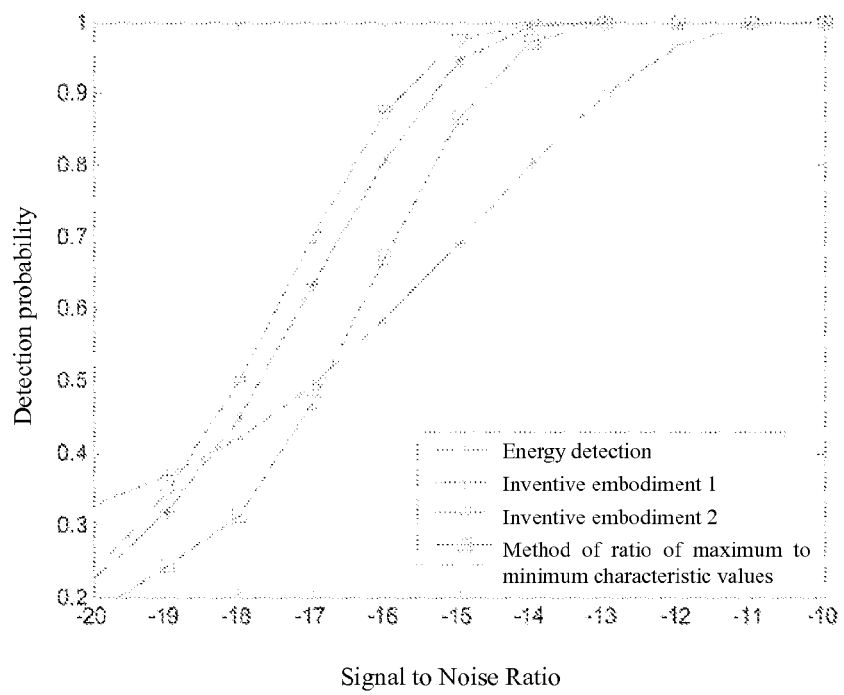
FIG. 5 is a schematic diagram of performance comparison between the method of an embodiment of the invention and the background technology, which regards to wireless microphone signals.

With simulation, FIG. 5 provides performance comparison between the method of the inventive embodiment and the background technology. The energy detection (the noise variance is precisely known), the background technology (i.e., method of ratio of maximum characteristic values to minimum characteristic values) and the method of the inventive embodiment are compared. The simulation result of FIG. 5 takes the spectrum detection of a wireless microphone signal as an example. As can be seen from the drawings, the embodiments 1 and 2 of the invention have gains greater than 2 dB and 3 dB as compared with the energy detection without noise uncertainty, respectively. In addition, the embodiment 2 of the invention has a performance gain greater than 1 dB as compared with the method of ratio of maximum characteristic values to minimum characteristic values. It should be noted that the method of the inventive embodiment and the method of ratio of maximum characteristic values to minimum characteristic values both are insensitive to the noise uncertainty, i.e., the noise uncertainty does not affect the performance. When the noise uncertainty exists, the energy detection has severe "Signal to Noise Ratio (SNR) wall" phenomenon, and the invention will have greater performance advantage. As can be seen from the simulation result, the method of the inventive embodiment has low complexity and superior performance.

Those of ordinary skill in the art can understand that all of or part of the steps of the above-mentioned method can be completed by directing a related hardware through a program which can be stored in a computer-readable medium, such as a read only memory, a disk, an optical disk etc. Optionally, all of or part of the steps of the above-mentioned embodiments can also be realized by using one or more integrated circuits. Correspondingly, various modules/units of the above-mentioned embodiments can be realized in a hardware form, as well as a form of software function module. The inventive embodiment is not limited to the combination of hardware and software in any specific form.

The invention claimed is:

1. A blind spectrum sensing method based on fast Fourier transform comprising:
   receiving a wireless signal on a frequency band to be sensed;
   after sampling and filtering the received wireless signal, calculating the autocorrelation coefficient of the sampled and filtered wireless signal;
   performing fast Fourier transform of the autocorrelation coefficient on M point, and performing spectrum sensing according to the result of fast Fourier transform;
   performing modular operation on the result of fast Fourier transform, recording the module values as $f_1, f_2, \ldots, f_M$, and constructing numerical values $T_1$ and $T_2$ according to the module values, wherein $T_1$ and $T_2$ both are multivariate functions of $f_1, f_2, \ldots, f_M$, which at least includes one of the $f_1, f_2, \ldots, f_M$, respectively; and
   calculating a judgment variable $T = T_1 T_2$, when T is greater than the preset judgment threshold, judging that an authorized signal exists on the spectrum, and when T is less than the preset judgment threshold, judging that no authorized signal exists.

2. The blind spectrum sensing method based on fast Fourier transform according to claim 1, wherein, the construction method for T is at least one of $T_1 = \max(f_1, f_2, \ldots, f_M)$ and $T_2 = \min(f_1, f_2, \ldots, f_M)$, wherein max( ) and min ( ) represent maximizing and minimizing operations, respectively; or $T_1 = \max(f_1, f_2, \ldots, f_M)$, and $T_2$ is linear superposition of $f_1, f_2, \ldots, f_M$.

3. The blind spectrum sensing method based on fast Fourier transform according to claim 1, wherein the point number M of fast Fourier transform is $2\lceil \log_2 L \rceil$, and wherein $\lceil \ \rceil$ represents rounding up to an integer.

4. The blind spectrum sensing method based on fast Fourier transform according to claim 1, wherein the judgment threshold is calculated by at least one of theory or simulation according to at least one of the desired false alarm probability or detection probability.

5. The blind spectrum sensing method based on fast Fourier transform according to claim 1, wherein the sensing method is suitable for at least one of spectrum sensing of a multi-antenna system or cooperative sensing of multiple nodes.

6. The blind spectrum sensing method based on fast Fourier transform according to claim 1, further comprising obtaining the correlation coefficient after sampling filter, N sample signals are expressed as x(0), x(1), . . . , x(N−1), by the following method:

selecting the length of the calculation window as L, and calculating the correlation coefficient of the sample signal from l=0, . . . , L−1:

$$\lambda_l = \frac{1}{N} \sum_{n=0}^{N-1} x(n) x^*(n-l)$$

wherein when n−l<0, x(0)=0, the operation symbol (*) represents conjugate calculation, the sample number N is a positive integer greater than 1, and the window length L is a positive integer greater than or equal to 1.

7. The blind spectrum sensing method based on fast Fourier transform according to claim 6, wherein the sample number N is determined according to the spectrum sensing period and the spectrum sensing precision.

8. The blind spectrum sensing method based on fast Fourier transform according to claim 6, wherein the window length L is determined according to the computational capability and the spectrum sensing precision of the sensing device and complexity of fast Fourier transform.

9. A blind spectrum sensing device based on fast Fourier transform, comprising:

a wireless signal sampling and filtering module, a correlation coefficient calculation module, a fast Fourier transform module, a module value calculation module, a judgment variable calculation module, and a judgment module, wherein the wireless signal sampling and filtering module is used for obtaining a wireless signal of the sensed frequency band;

the correlation coefficient calculation module is used for calculating the autocorrelation coefficient of the signal to be sensed;

the fast Fourier transform module is used for performing fast Fourier transform of the autocorrelation coefficient on M point and performing spectrum sensing according to the result of fast Fourier transform;

the module value calculation module is used for performing modular operation on the result of fast Fourier transform;

the judgment variable calculation module is used for constructing the judgment variable according to the module values; and the judgment module includes a comparator used for comparing the judgment variable and the judgment threshold.

* * * * *